May 17, 1938.  W. H. BISHOP  2,117,598
SLIDING ROOF FOR VEHICLES
Filed Dec. 12, 1936  3 Sheets-Sheet 1
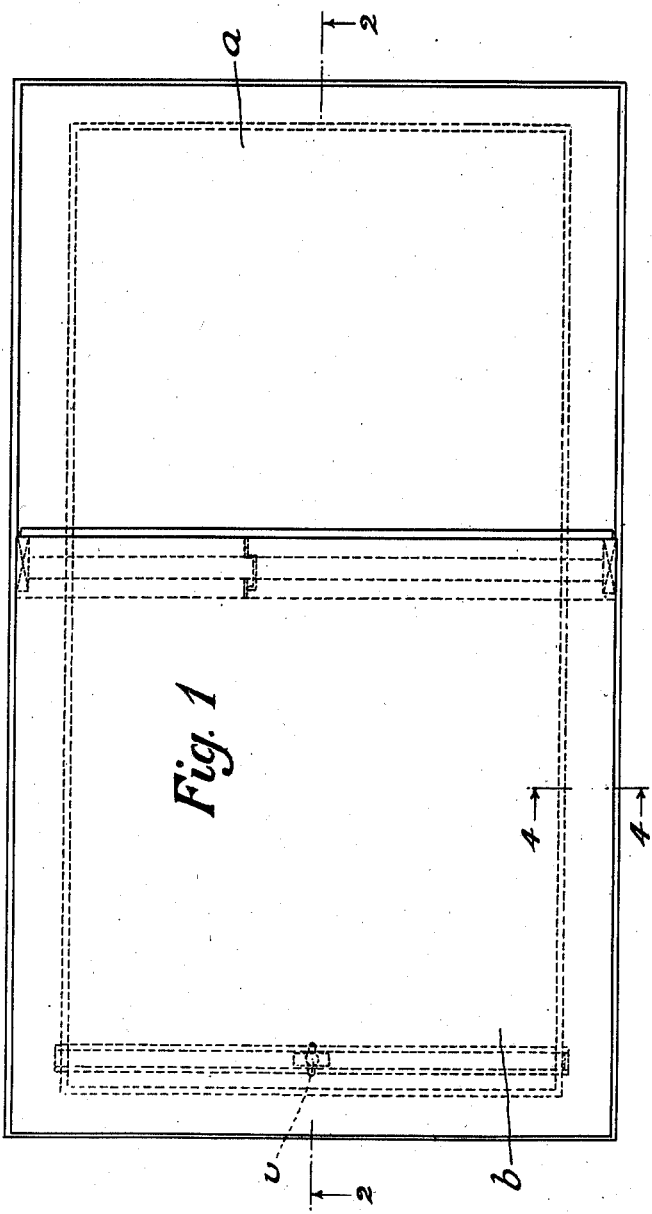
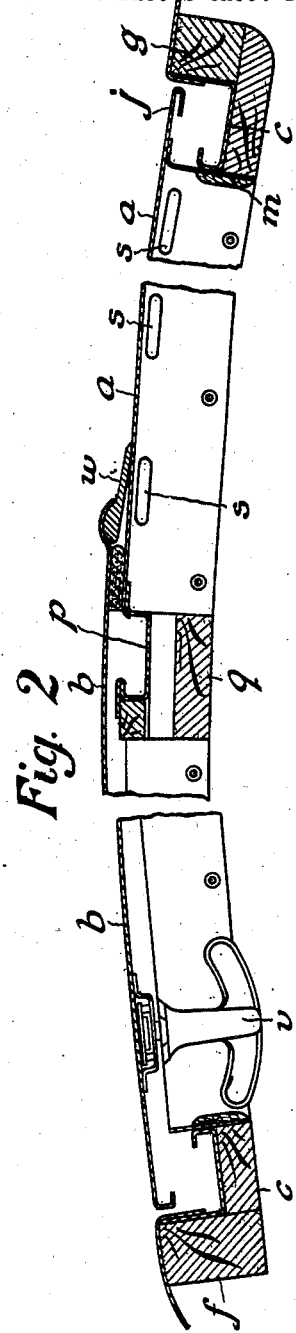
INVENTOR
William Henry Bishop.
By Andrew Wilson,
His Attorney.

May 17, 1938.  W. H. BISHOP  2,117,598
SLIDING ROOF FOR VEHICLES
Filed Dec. 12, 1936  3 Sheets-Sheet 2

INVENTOR
William Henry Bishop
By Andrew Wilson,
His Attorney.

May 17, 1938.  W. H. BISHOP  2,117,598
SLIDING ROOF FOR VEHICLES
Filed Dec. 12, 1936   3 Sheets-Sheet 3
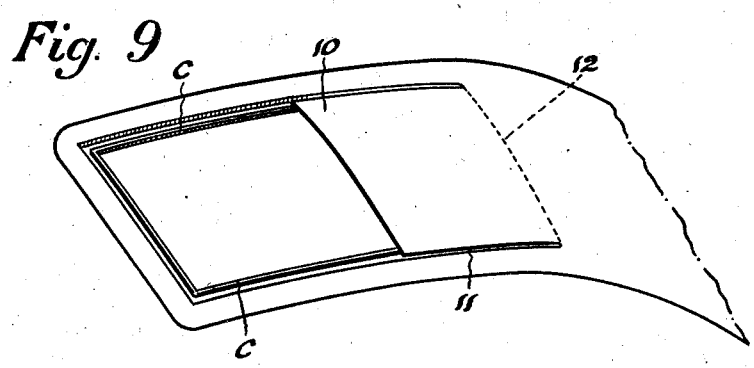
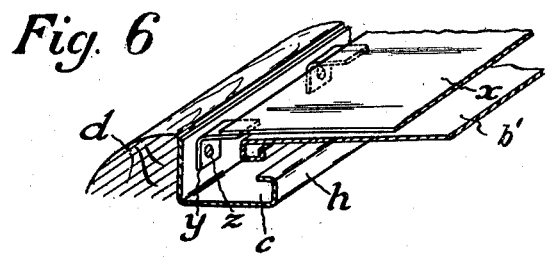
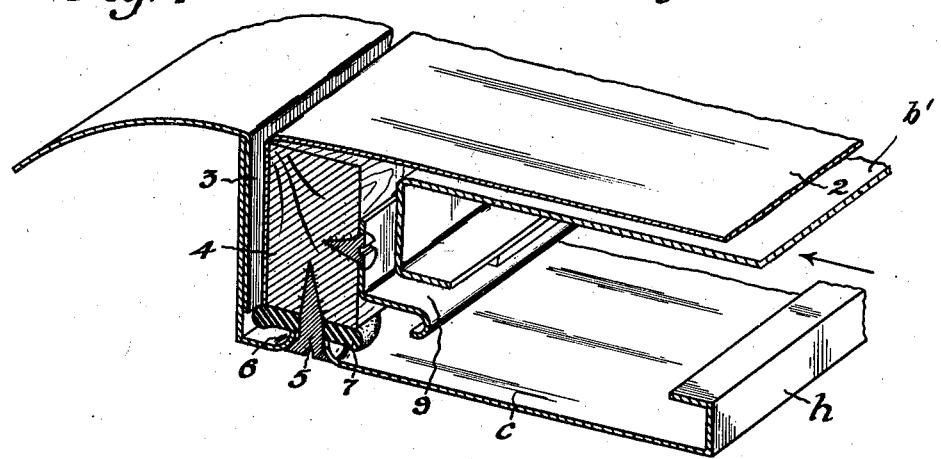
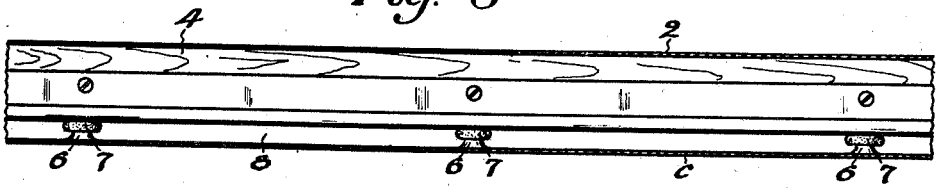
INVENTOR,
William Henry Bishop.
By Andrew Wilson.
His Attorney.

Patented May 17, 1938

2,117,598

UNITED STATES PATENT OFFICE 2,117,598

SLIDING ROOF FOR VEHICLES

William Henry Bishop, Birmingham, England

Application December 12, 1936, Serial No. 115,450
In Great Britain October 3, 1935

7 Claims. (Cl. 98—2)

This invention relates to improvements in sliding roofs for vehicles in which an opening in the front part of the roof is adapted to be covered or uncovered by a longitudinally slidable panel which when opened slides under or over a fixed canopy over the rear part of the roof.

The usual practice in a roof of this kind is for the panel to slide under the rear canopy which is secured along its longitudinal and rear edges to the sides and quarters of the roof by means of mouldings or exposed screws. The object of my invention is to provide an improved method of mounting the fixed rear canopy which eliminates the usual fixing means and so saves labour and material costs, which simplifies the construction and fitting of the roof, which enables adequate ventilation of the vehicle to be obtained without draughts and without the risk of rain entering, and which gives increased head room in the rear part of the vehicle.

According to my invention the side edges of the fixed rear canopy in a vehicle roof are spaced from the adjacent sides of the roof to leave longitudinal slots or openings through which air can pass freely to and from the interior of the vehicle, the canopy being supported by members extending upwardly from the sides of a longitudinal opening in the roof or by any other convenient means which permit the free passage of air. The rear edge of the canopy may also be spaced from the rear quarter of the roof or it may be secured to or be continuous with the rear quarter as desired.

The sliding panel when opened is adapted to slide over or under the fixed canopy which is conveniently formed by a metal sheet, and the under side of the canopy is painted or trimmed to match the interior of the vehicle so that the height usually occupied by cross-members carrying the head lining is saved and additional headroom is provided under the canopy.

Where the sliding panel when opened slides over the fixed canopy the panel may have downwardly turned side edges which slide in the space between the side edges of the canopy and the sides of the roof.

Some practical forms of sliding roof made in accordance with my invention have been illustrated by way of example in the accompanying drawings in which:—

Figure 1 is a plan of the opening in the roof showing the fixed canopy and the sliding panel.

Figure 2 is a longitudinal vertical section on the line 2—2 of Figure 1.

Figure 6 is a fragmentary sectional perspective view showing an alternative method of mounting the canopy where the panel slides under the canopy when opened.

Figure 7 is a similar sectional perspective view showing another method of mounting the canopy and guiding the panel which slides under the canopy.

Figure 8 is a fragmentary view of the canopy mounting of Figure 7 looking in the direction of the arrow in Figure 7.

Figure 9 is a diagrammatic perspective view of a pressed steel roof showing another method of arranging the canopy.

In the construction shown in Figures 1 to 5 of the drawings a longitudinal rectangular opening in a vehicle roof is closed over its rear part by a sheet metal canopy $a$ and over its front part by a slidable panel $b$ which can be slid rearwardly over the canopy $a$.

Along each side and across the front and rear ends of the opening there is a continuous sheet metal channel or tray $c$ having at its outer edge an upstanding flange $d$ which is secured to the cantrails $e$ and front and rear cross-members $f$ and $g$ of the roof, and at its inner edge an upstanding water-check flange $h$ with an inturned edge, the tray being connected with the outside of the vehicle by the usual drain outlets. The canopy $a$ is formed by a metal sheet having its side and rear edges flanged over downwardly and inwardly to form a smooth lip $j$, and the canopy is supported adjacent to each side by an upstanding longitudinal strip $k$ secured against the side edge of the roof opening and having at its upper edge a flange which is spot welded or otherwise secured to the under side of the canopy. In the arrangement illustrated the strips $k$ are screwed to a wooden trimming strip $l$ which is secured to the under side of the tray $c$ and carries the lining of the body, but they may be secured to the inner face of the water-check flange $h$. Alternatively the water-check flange may be omitted and the strips $k$ replaced by vertical flanges on the inner side of the tray. In the arrangement shown in Figure 2 the rear edge of the canopy is supported by a strip $m$ similar to the strips $k$, while in the arrangement shown in Figure 5 the rear edge $j'$ of the canopy is stepped up and supported in a rebate $n$ on the upper face of the roof cross-member $g'$.

Figure 3:
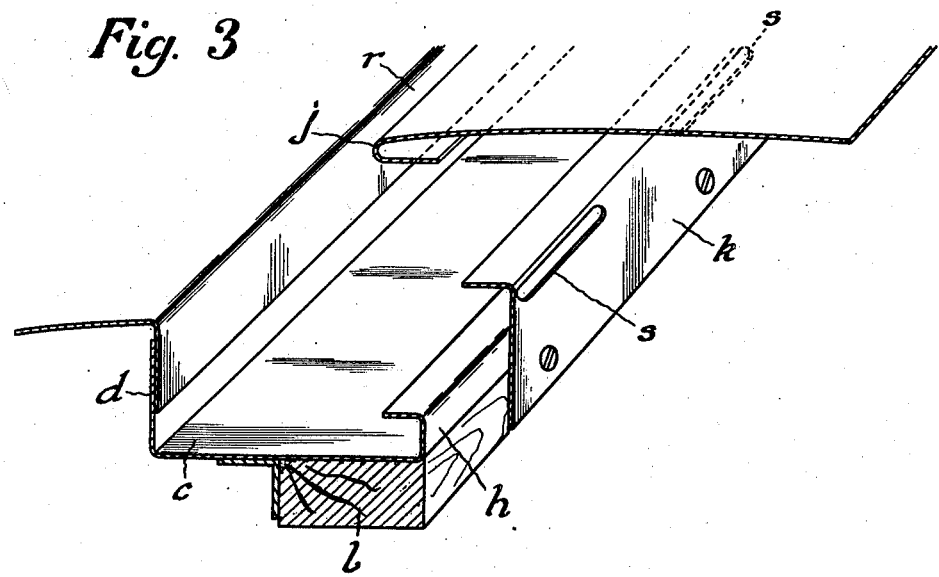
Figure 3 is a fragmentary section in perspective through one side of the fixed canopy and its mounting.

The side edges of the canopy are spaced from the sides of the roof opening, as is best shown in Figure 3, to leave a relatively narrow slot $r$ for the passage of air, and a series of openings $s$ are pierced in the strips $k$ so that air can pass freely through the slots $r$ and openings $s$ to give adequate ventilation of the interior of the vehicle. Any water which finds its way through the slots $r$ is trapped in the tray $c$ and drained away so that no water can enter the vehicle.

In an alternative construction the continuous strips $k$ having openings $s$ may be replaced by spaced lugs or brackets between which air can pass.

Figure 4:
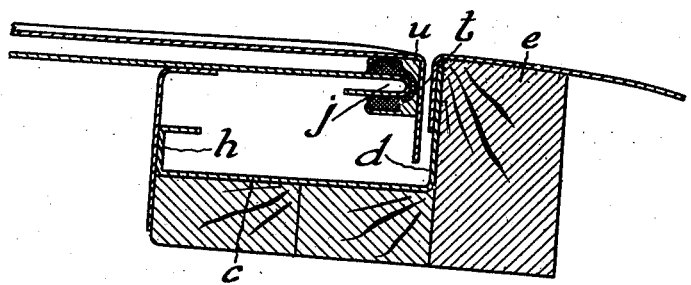
Figure 4 is a cross-section through one side of the sliding panel on the line 4—4 of Figure 1 showing the way in which it is guided on the canopy.
Figure 5:
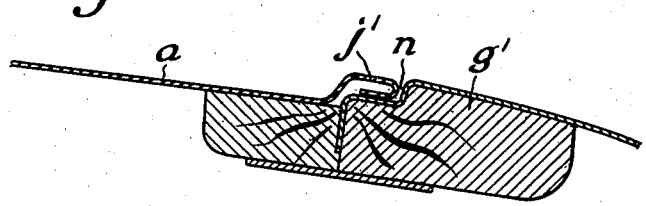
Figure 5 is a longitudinal section through the rear end of the canopy and the roof opening showing an alternative method of mounting the rear end of the canopy.

The sliding panel $b$ is also made from a metal sheet and when opened is adapted to slide over the canopy $a$ which is stepped down below the level of the roof by an amount substantially equal to the thickness of the panel so that the panel is substantially flush with the roof when opened. The side edges $t$ of the panel are turned downwardly and slide in the slots $r$ between the side edges of the canopy and the sides of the roof opening. Adjacent to the rear end of the panel at each side there is provided a felt-lined runner $u$ which engages and slides on the side edges of the canopy as shown in Figure 4 to guide the rear part of the panel. The front part of the panel is slidably guided in any convenient manner, and there is provided any convenient form of locking device operated by the handle $v$ for holding the panel in the closed, open or any intermediate position. The rear edge of the panel is provided with a lipped rubber bead $w$ which engages with the upper surface of the canopy to make a weathertight joint, but any water which finds its way between the panel and the canopy will be trapped in the channel $p$ which leads it into the tray $c$.

The under side of the canopy $a$ is trimmed or painted to match the interior of the vehicle so that the height usually occupied by cross-members underlying the canopy to carry the headlining is saved and this amount of additional head-room is provided under the canopy.

The modified construction shown in Figure 6 is designed for use with a sliding panel which when opened slides under the canopy. In this construction the side edges of the canopy $x$ which are spaced from the adjacent sides of the roof opening are supported at intervals by angle strips or brackets $y$. One limb of each strip is spot welded to the under side of the canopy while the other limb is secured by a screw $z$ to the outer wall $d$ of the tray $c$. The rear edge of the panel $b'$ may simply slide between the canopy and the water-check flange $h$ on the tray or it may be provided with runners guided on the flange $h$.

In the alternative construction shown in Figure 7 each side edge of the canopy 2 is turned downwardly at 3 and secured to a longitudinally extending wooden fillet 4. This fillet is secured at intervals to the base of the tray $c$ by screws 5 of which the heads are received in sockets 6 punched upwardly in the metal of the tray, and thick rubber washers 7 are located between the bottom of the fillet and these sockets so that there is a substantial space 8 between the bottom of the fillet and the tray through which air can circulate freely. The rear part of the sliding panel, which is of less width than the canopy, is guided on a flanged strip 9 which is secured to the inner face of the fillet 4.

In both of these constructions ramps or equivalent means are preferably employed to bring the rear edge of the panel up flush with the canopy as the panel reaches the closed position in its forward movement.

In a vehicle having a complete pressed steel construction the canopy may be integral with the rear quarter pressing as shown at 10 in Figure 9, longitudinal slots 11 being provided between the side edges of the canopy and the sides of the roof. In this case one or two supports may be provided to support the canopy towards its forward end.

In an alternative arrangement the canopy may be a separate pressing welded along the dotted line 12 to the rear quarter pressing of the roof.

I claim:

1. A vehicle roof having a longitudinal opening therein, a fixed canopy in one end of said opening, ventilating channels between the side edges of the canopy and the adjacent sides of the roof opening, water trapping means below such channels, and a longitudinally slidable panel for optionally covering the other end of said roof opening or uncovering the same.

2. A vehicle roof having a longitudinal opening therein, a fixed canopy in one end of said opening, ventilating channels between the side edges of the canopy and the adjacent sides of the roof opening, means for supporting the canopy from the sides of the roof, openings in said means for the passage of air between the ventilating channels and the interior of the vehicle, water trapping means below such channels, and a longitudinally slidable panel for optionally covering the other end of said roof opening or uncovering the same.

3. A vehicle roof having a longitudinal opening therein, a fixed canopy in one end of said opening, ventilating channels between the side edges of the canopy and the adjacent sides of the roof opening, longitudinal, supporting strips, provided with ventilating openings and connecting the canopy with the sides of the roof, water trapping means below such channels, and a longitudinally slidable panel for optionally covering the other end of said roof opening or uncovering the same.

4. A vehicle roof having a longitudinal opening therein, a fixed canopy in one end of said opening, ventilating channels between the side edges of the canopy and the adjacent sides of the roof opening, water trapping means below such channels, and a slidable panel provided with downwardly turned edges adapted to slide in said ventilating channels to guide and permit the panel to slide over the fixed canopy.

5. A vehicle roof having a longitudinal opening therein, a fixed canopy in one end of said opening, ventilating channels between the side edges of the canopy and the adjacent sides of the roof opening, water trapping means below such channels, a longitudinally slidable panel for optionally covering the other end of said roof opening or uncovering the same, and runners on one end of said panel slidably engaging the side edges of the canopy.

6. A vehicle roof having a longitudinal opening therein, a fixed canopy in one end of said opening, ventilating channels between the side edges of the canopy and the adjacent sides of the roof opening, a longitudinal, channeled member along each side of the roof opening and extending below the adjacent ventilating channel, supports projecting upwardly from said channeled members to carry the fixed canopy, and a longitudinally slidable panel adapted in one position to close the open end of said roof opening and in another position to slide into horizontal parallelism with the canopy.

7. A vehicle roof having a longitudinal opening therein, a fixed canopy in one end of said opening, ventilating channels between the side edges of the canopy and the adjacent sides of the roof opening, a longitudinal, channeled member along each side of the roof opening and extending below the adjacent ventilating channel, supports projecting upwardly from said channeled members to carry the fixed canopy and so arranged as to allow air to pass between the ventilating channel and the interior of the vehicle, and a longitudinally slidable panel adapted in one position to close the open end of the roof opening and in another position to slide under the canopy, and guides for the panel below the canopy.

WILLIAM HENRY BISHOP.